Nov. 15, 1966  W. E. HAMEL  3,284,994

SICKLE

Original Filed June 3, 1963  3 Sheets-Sheet 1

INVENTOR
WILLIAM E. HAMEL

Nov. 15, 1966   W. E. HAMEL   3,284,994
SICKLE
Original Filed June 3, 1963   3 Sheets-Sheet 2

INVENTOR
WILLIAM E. HAMEL

Nov. 15, 1966  W. E. HAMEL  3,284,994
SICKLE
Original Filed June 3, 1963  3 Sheets-Sheet 3
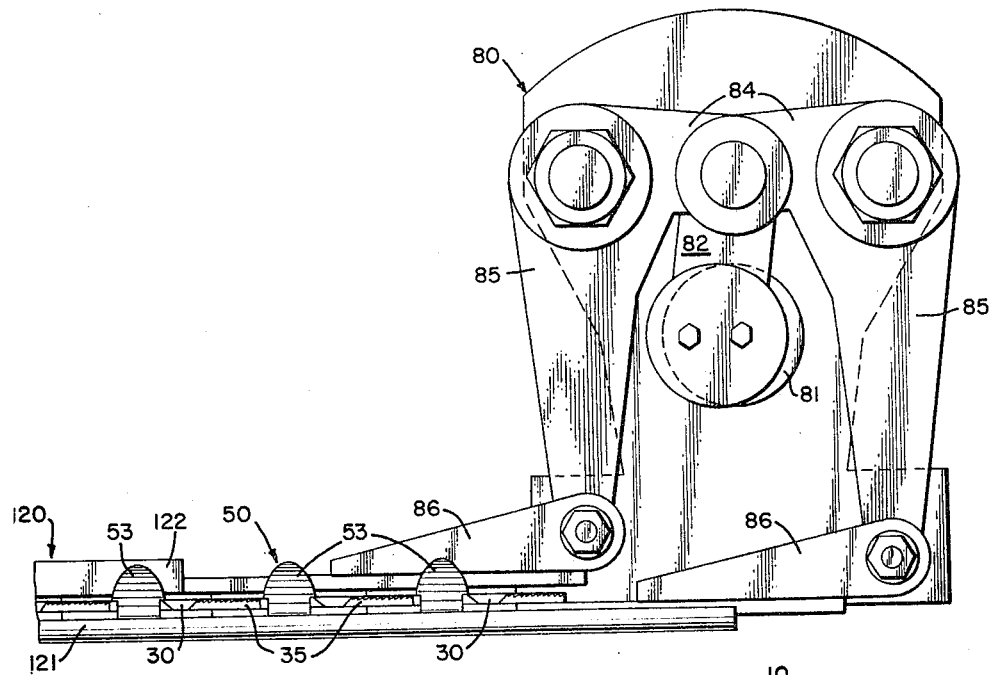
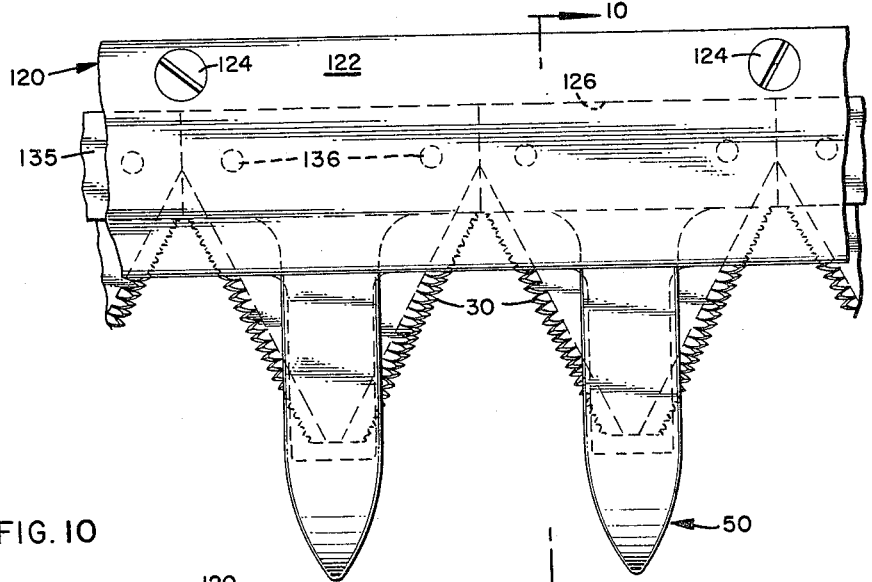
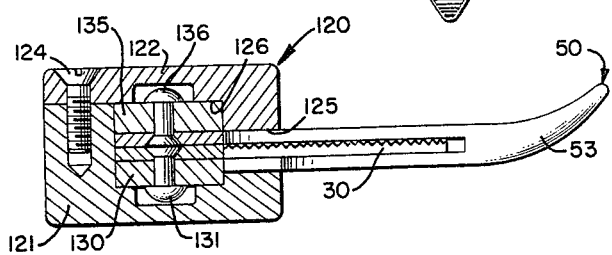
INVENTOR
WILLIAM E. HAMEL ns
3,284,994
SICKLE
William E. Hamel, Box 1036, Dos Palos, Calif.
Continuation of application Ser. No. 295,856, June 3, 1963. This application Oct. 28, 1963, Ser. No. 319,404
11 Claims. (Cl. 56—298)

The present invention relates to an improved sickle employed in the harvesting of alfalfa, straw, grain, soy beans, and other fabaceous crops. More particularly, the present invention relates to such a sickle having co-acting cutting teeth and guards wherein the guards are reciprocated and the teeth may be stationary or reciprocated relatively to the guards. It has been discovered that such a structure virtually eliminates the clogging to which previous sickles have been notoriously subjected.

This application is a continuation of my co-pending application Serial No. 295,856, filed June 3, 1963 (now abandoned).

Sickle tooth clogging has long been a problem with conventional sickles, particularly when harvesting dense strands of fabaceous crops or when the crop is down, wet, or tangled. Conventional sickles employ rigidly mounted stationary tooth guards which extend forwardly from reciprocated teeth employed in the sickles. The stationary guards have been found to be primarily responsible for tooth clogging inasmuch as the guards cannot readily penetrate the crop under such adverse conditions and tend to become tangled therewith, directing large bunches of the crop into the sickle teeth in a volume which cannot adequately be accommodated thereby. Also, the stationary guards tend to mash down a considerable portion of the crop which is passed over by the sickle teeth and remains uncut. Further, the teeth of such sickles usually require repair or sharpening after approximately every 100 acres of use and more often where a large amount of dirt or sand is present on the plants. This has long been recognized as a problem of conventional sickles.

A quest for solutions to these problems resulted in the invention comprising the subject matter of my U.S. Patent No. 3,151,434, which extended the teeth outwardly in overhanging relation to their stationary guard members. This structure exhibited considerable advantage over the prior devices and constituted an advance of substantial practical significance. The instant invention is a further development of the same efforts to overcome the long recognized shortcomings of the prior sickles and provides a virtually clog-proof sickle capable of effective operation under all conditions.

Therefore, it is the broad object of the present invention to provide an improved sickle.

Another object is to provide a sickle which is effectively operable for extended periods of use without servicing.

Another object is to provide such a sickle having a plurality of cutting teeth and co-acting guards which is effective virtually to eliminate clogging of the teeth.

Another object is to provide an improved sickle having tooth guards which virtually eliminate mashing and bending crop material ahead of the sickle.

Another object is to provide an improved sickle having reciprocated tooth guards extended ahead of the sickle teeth so as to more readily penetrate and precondition crop material ahead of the teeth.

Another object is to provide an improved sickle having tooth guards with cutting edges co-acting with the teeth in a manner so as to minimize the entrance of crop material therebetween.

Another object is to provide an improved sickle having reciprocated tooth guards which may be employed to convert either single or double reciprocable conventional sickles to the structure of the present invention.

Another object is to provide an improved sickle having reciprocated tooth guards which may be employed with either stationary, oppositely reciprocated, or even continuously traveled sickle teeth.

Other objects and advantages of the present invention will subsequently become apparent upon reference to the description in the specification.

In the drawings:

FIGURE 8 is a top plan view of the sickle of present invention having a dual sickle mounting modified from the single sickle mounting of the first form of the invention.

FIGURE 9 is a fragmentary side elevation of the dual sickle showing the drive mechanism connecting therewith.

FIGURE 10 is a transverse vertical section through the dual sickle taken on the line 10—10 of FIGURE 8.

Figure 1:
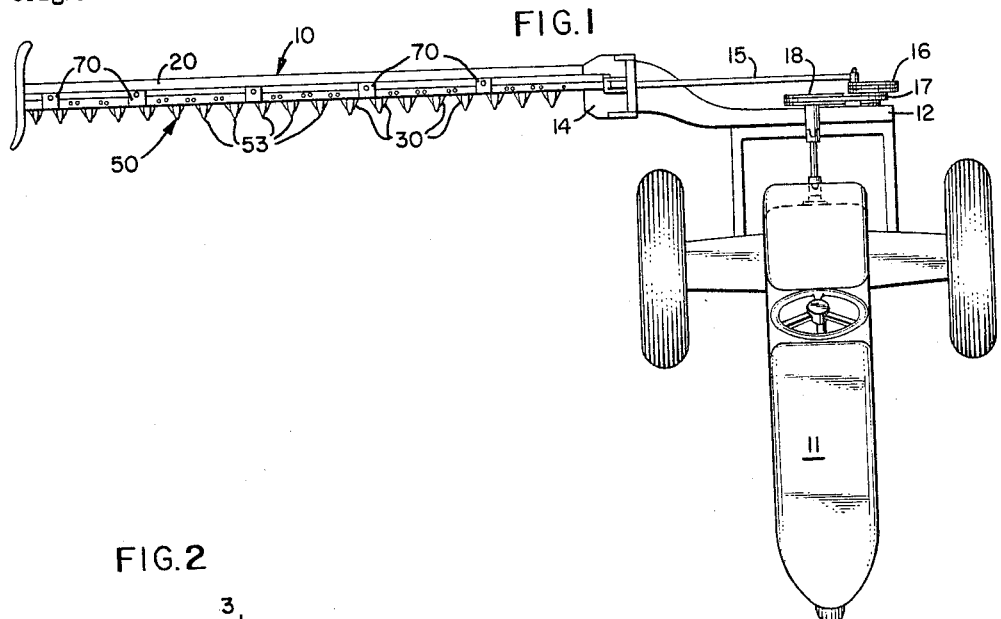
FIGURE 1 is a top plan view of the sickle of the present invention mounted in operating position on a tractor.

Referring more particularly to the drawings, a sickle embodying the principles of the present invention is indicated generally at 10. The sickle is mounted for earth traversing movement in a predetermined forward direction of travel on a tractor 11. The tractor includes a sickle mounting frame 12 which carries a reciprocating drive mechanism 14 disposed transversely outwardly of the tractor. The drive mechanism is actuated by a crank arm 15 which is connected to an eccentric drive pulley 16 on the mounting frame 12. The pulley 16 is, in turn, driven through a V-belt 17 trained about a tractor power take-off pulley 18.

Figure 3:
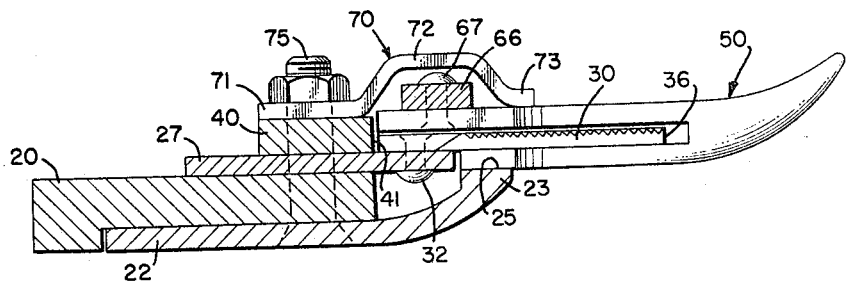
FIGURE 3 is a transverse vertical section through the sickle taken on line 3—3 of FIGURE 2.

The sickle 10 provides an elongated support arm 20 which is pivotally mounted on the sickle mounting frame 12 on the tractor 11 adjacent the drive mechanism 14. Suitable control means, not shown, is provided on the tractor for positioning the support arm between the substantially horizontal work position, shown in FIGURE 1, to an elevated substantially vertical carrying position adjacent the tractor, as is well known in mowing machines. As best shown in FIGURE 3, the lower surface of the support arm 20 provides a recess to receive a shoe member 22 which has a transversely outwardly extended arcuately curved forward rail portion 23 spaced in substantially parallel relation to the support arm. The rail portion of the shoe also provides a substantially flat wear surface 25 disposed in substantially co-planar relation with the upper surface of the support arm 20. An elongated tooth mounting plate 27 is superimposed on the support arm in substantially parallel forwardly displaced overhanging relation to the support arm and terminates immediately short of the wear surface 25 of the shoe 22.

Figure 2:
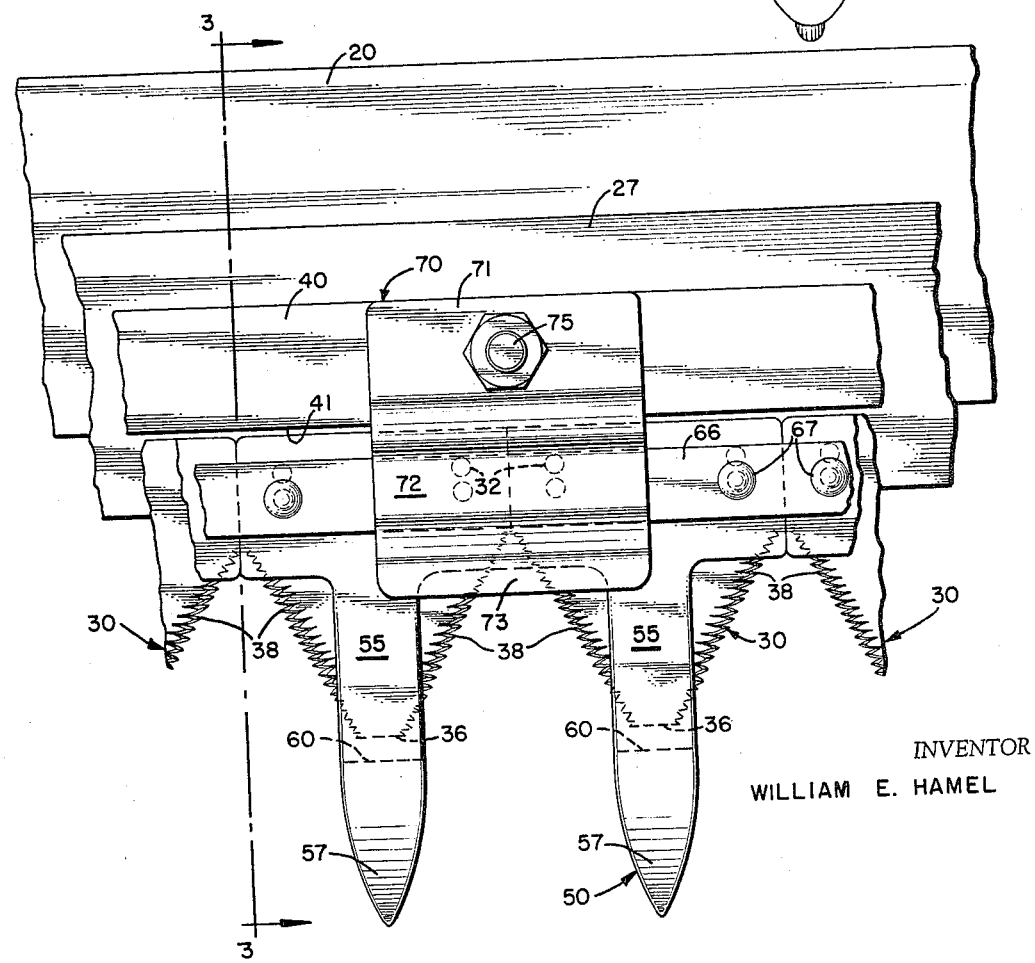
FIGURE 2 is a somewhat enlarged fragmentary top plan view of the sickle of FIGURE 1.
Figure 5:
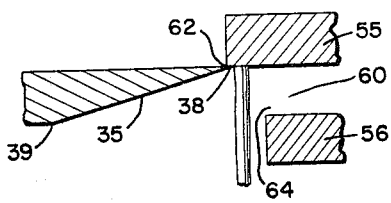
FIGURE 5 is a fragmentary section through a tooth and a guard in one co-acting operating position.
Figure 6:
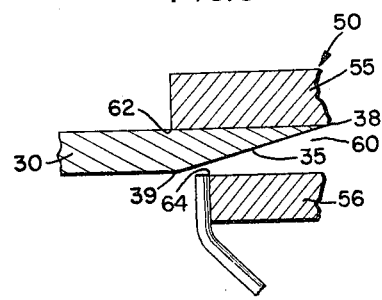
FIGURE 6 is a fragmentary section similar to FIGURE 5 showing the guard and tooth advanced to a second operating position.

A plurality of substantially triangularly shaped cutting teeth 30 are mounted, as by rivets 32, upon the tooth mounting plate 27 adjacent the forward portion thereof in transversely outwardly extended relation from the support arm 20. As best shown in FIGURES 2, 5 and 6, the teeth include outwardly convergent side portions 35 which terminate in outer apices 36. The side portions are downwardly beveled to provide opposite upper leading cutting edges 38 and opposite lower trailing cutting edges 39. An elongated hold-down strip 40 is superimposed on the tooth mounting plate 27 on the support arm 20 and provides a forward side 41 lying in a plane aligned with the forward edge of the support arm 20.

Figure 4:
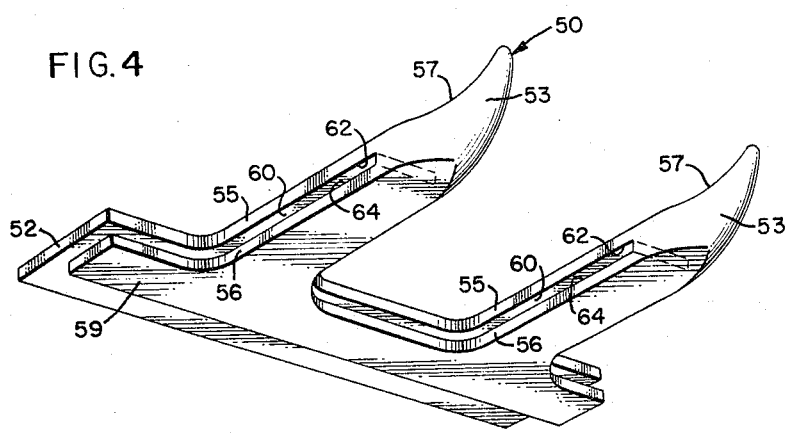
FIGURE 4 is a perspective of the underside of the tooth guard removed from the sickle of the preceding figures.

A plurality of tooth guards 50 are disposed in side-by-side, forwardly extended relation from the sickle 10. One of the guards is shown in FIGURE 4 including an elongated upper mounting flange 52 and a pair of longitudinally spaced fingers 53 outwardly extended therefrom. The fingers include upper segments 55 and spaced substantially parallel lower segments 56 which converge in outer, upwardly curved ends 57. The ends 57 enable the fingers better to slide over irregularities encountered in the terrain traversed by the sickle. The lower segments of the fingers terminate in an elongated rearward flange 59 adapted slidably to rest upon the wear surface 25 of the shoe 22.

The upper and lower segments 55 and 56 of the fingers 53 define therebetween a co-planar slot 60 which terminates short of the outer ends of the fingers and is rearwardly open so as to accommodate the teeth 30 within the slot with the fingers disposed in wrapped-around relation thereto. The upper segment of the fingers provides a pair of opposite side edges 62 in marginal relation to the slot 60. The lower segment 56 of the fingers provides a pair of opposite side edges 64 also in marginal relation to the slot but displaced inwardly of the upper side edges 62.

An elongated mounting or slide bar 66 overlies and is rigidly connected to the upper flange 52 of the guards by rivets 67. As best shown in FIGURE 1, the slide bar has an inner end pivotally connected in driving relation to the crank arm 15 adjacent the mounting of the support arm 20 on the frame 12 of the tractor. Such structure is a complete reversal from conventional single sickle structures which have stationary guards and reciprocating teeth. While the structure of the present invention provides an entirely new concept it is designed so that with a minimum of alterations a conventional sickle can be quickly and easily converted ot the present structure utilizing the reciprocating guards 50.

A plurality of longitudinally spaced hold-down brackets 70 have rearward mounting portions 71 disposed upon the hold-down strip 40, upwardly arcuately curved intermediate portions 72 over the slide bar 66 and forwardly downwardly extended shoe portions 73 rested against the upper flange 52 in bridging relation between the fingers 53 of the guards 50. A plurality of longitudinally spaced bolts 75 are extended through the support arm 20, the tooth mounting bracket 27, the hold-down strip 40 and the bracket 70 to hold such elements in rigid assembly and in supporting relation to the cutting teeth 30 and the reciprocable guards 50.

Figure 7:
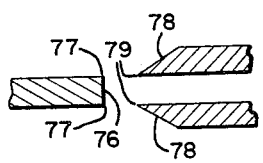
FIGURE 7 is a fragmentary section similar to FIGURES 5 and 6, wherein the tooth and guard provide cutting edges modified from that shown in the preceding figures.

A modified form of the guards 50 and the teeth 30 is shown in FIGURE 7. The FIGURE 7 embodiment differs from the embodiment of FIGURES 2–6 in that in FIGURE 7 the guard edges are beveled and the teeth edges are perpendicular, a reversal of the relationship in FIGURES 2–6. Further, in the FIGURE 7 embodiment, the guard edges are vertically aligned with each other in contrast to the inward off-set location of the lower guard edges 64 of the FIGURES 2–6 embodiment. In this form, the teeth have substantially straight upright side edges 76 having upper and lower co-planar cutting edges 77. The guards include opposite upper and lower beveled sides 78 converging toward the teeth to provide spaced co-planar cutting edges 79.

As best shown in FIGURES 8, 9 and 10, the tooth guards 50 and the teeth 30 of the present invention can also be readily utilized in converting a conventional double sickle to the improved structure of the present invention. In this embodiment, the sickle mounting frame 12 carries a double reciprocating drive mechanism indicated generally by the reference numeral 80 in FIGURE 9. The drive mechanism includes a double throw crank shaft 81 which is adapted to be driven by suitable linkage, not shown, from the power take-off drive unit of the first embodiment of FIGURE 1. The crank shaft mounts a pair of connecting arms 82 which are individually pivotally connected to a pair of opposite rocker arms 84. The rocker arms each include depending arm portions 85 having connecting members 86 pivotally mounted thereon.

The support arm 20 of the first embodiment is replaced in this form by an elongated substantially box-like support arm 120 pivotally mounted, as in the first form, on the sickle mounting frame 12 of the tractor. The support arm 120 includes a substantially L-shaped lower portion 121 having an inverted substantially L-shaped cap portion 122 secured thereto by a plurality of recessed screws 124. The lower and cap portions of the support arm terminate short of each other along the forward side of the arm to define an elongated longitudinally extended opening 125 which communicates with an internal substantially rectangular bore 126 therein.

In this embodiment, the tooth mounting plate 27 of the first form is replaced by an elongated mounting or slide bar 130 rigidly to mount the cutting teeth 30 thereon in forwardly extended relation from the support arm 120 by rivets 131. An upper mounting or slide bar 135 similar to the slide bar 66 of the first form of the invention is disposed within the bore 126 of the arm adjacent the cap portion 122 thereof rigidly to mount the tooth guards 50 by rivets 136 in outward extension through the opening 125 and in wrap-around relation to the teeth 30, as before. The inner ends of the slide bars 130 and 135 are individually connected to the connecting members 86 of the drive mechanism 80 for opposite reciprocation of the tooth and guards relative to each other.

OPERATION

The operation of the described embodiments of the subject invention is believed to be clearly apparent and is briefly summarized at this point. With the sickle 10 of the present invention disposed in a substantially horizontal operating position, as shown in FIGURE 1, the slide bar 66 is reciprocated by actuation of the power take-off drive pulley 18 on the tractor 11 through the eccentric pulley 16 and the crank arm 15. Such movement causes the tooth guards 50 to be reciprocated relative to the stationary cutting teeth 30.

In each direction of movement, the fingers 53 of the guards are moved from their positions shown in FIGURE 2 aligned with the apices of their corresponding teeth to similar positions at their extent of travel aligned with the apices of adjacent teeth. During such movement, the upper leading cutting edges 38 of the teeth co-act in shearing engagement with the upper edges 62 of the fingers so that crop material trapped therebetween is severed, as in FIGURE 5. With further movement of the guards, as in FIGURE 6, the remaining stalk portion of the crop is shoved ahead of the lower segment 56 thereof by the beveled side portions 35 of the teeth to a position below and completely removed from the slot 60 in the fingers.

Such arrangement insures that the stalk portion of the crop is not drawn into the slot 60 and permitted to accumulate and wedge between the teeth and the guards. The reciprocating fingers of the guards also have a stirring effect which more readily penetrates the crop to lift and guide the same into the sickle even when the crop is down, wet or tangled. The fingers also serve as dividers during such stirring action to distribute the crop more evenly between the coacting cutting edges of the teeth and guards for more efficient cutting action.

The operation of the second form of the guards 50 and the teeth 30 of FIGURE 7 is basically similar to that described above except for the manner in which the stalks are engaged simultaneously by the cutting edges 77 of the teeth in shearing engagement with the upper and lower edges 79 of the guards. Upon movement of the guards relative to the teeth, as shown in FIGURES 5 and 6, a severed portion of the stalk is pushed outwardly of the slot by the tooth. The lower stalk portion is then laterally bent away from the slot 60 by the beveled sides 78 during continued reciprocal movement of the guards.

The tooth and guard arrangement of FIGURES 8, 9 and 10 is specifically adapted to double sickle installations. With the double drive mechanism 80 the guards and teeth are reciprocated in opposite directions. The guards and teeth are only reciprocated half the linear distance of the guards in the first form so as to provide the same relative movement therebetween. As a result, the combined movement is equal to the extent of travel of the guards in one direction in the single sickle arrangement of the first form of the present invention. As before, during such movement, each finger of the guards is indexed from a position aligned with the apex portion of one tooth to a position aligned with the apex of the adjacent tooth.

The tooth and guard arrangement of the present invention provides an improved sickle with virtually eliminates clogging even under the most adverse conditions. Such structure is readily adapted to both single and double sickles and may be employed in converting existing single or double sickles to the improved tooth and guard arrangement. Inasmuch as no, or a minimum of, accumulation develops between the teeth and guards, a relatively small amount of horsepower is required to drive the mechanism when cutting through even the most dense strands of crop material. Also, the blades are maintained in substantially co-planar relation which substantially reduces wear therebetween.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A sickle comprising an elongated support arm; an elongated mounting bar borne by the support arm and being longitudinally reciprocable relative thereto from a power source remotely of the sickle; a plurality of sickle guards rigidly connected to said mounting bar having a plurality of longitudinally equally spaced fingers laterally outwardly extended therefrom, said fingers individually providing opposite upper and lower material guiding segments having opposite upper leading edges and spaced substantially parallel lower trailing edges defining a slot therebetween through the fingers; and a plurality of teeth rigidly connected to the support arm in slidable relation within said slot of the fingers and having laterally outwardly convergent side portions, said side portions being beveled to provide opposite upper leading cutting edges and lower trailing cutting edges in shearing engagement with said leading and trailing cutting edges of the fingers respectively so that during reciprocation of the guards the leading edges of the teeth and fingers co-act in shearing engagement to sever encountered material prior to engagement of their respective trailing edges with the latter displaced from each other to exhaust such material from the slot to minimize clogging of the sickle.

2. A sickle comprising an elongated support arm; an elongated mounting bar borne by the support arm being longitudinally reciprocable relative thereto from a power source remotely of the sickle; a plurality of sickle guards rigidly connected to said mounting bar having a plurality of longitudinally equally spaced fingers laterally outwardly extended therefrom, said fingers individually providing opposite upper and lower material guiding segments converging in outer tip portions and having opposite upper leading edges and spaced substantially parallel lower trailing edges defining a slot therebetween through the fingers; and a plurality of teeth rigidly connected to the support arm in slidable relation within said slot of the fingers and having laterally outwardly convergent side portions, said side portions being beveled to provide opposite upper leading cutting edges and lower trailing cutting edges in shearing engagement with said leading and trailing cutting edges of the fingers respectively so that during reciprocation of the guards the leading edges of the teeth and fingers co-act in shearing engagement to sever encountered material prior to engagement of their respective trailing edges with the latter displaced from each other to exhaust such material from the slot to minimize clogging of the sickle, and said tip portions of the guards being extended beyond the teeth to penetrate, divide and direct material between said co-acting edges of the teeth and guards.

3. A sickle comprising an elongated support arm adapted to be mounted on a vehicle for earth traversing movement in a predetermined direction; an elongated slide bar slidably mounted on the support arm being longitudinally reciprocable from a source of power on the vehicle; a plurality of sickle guards rigidly connected to said slide bar providing a plurality of longitudinally equally spaced fingers laterally outwardly extended from the slide bar and reciprocable therewith through a rectilinear path of movement transversely of said direction of the vehicle movement, each of said fingers having opposite upper and lower material guiding segments converging in outer upper arcuately curved tip portions, said segments including opposite upper leading edges and spaced substantially parallel lower trailing edges indented from their corresponding edges along said path of finger movement, said edges defining a slot between the segments of the fingers in a common plane aligned with said path of movement; and a plurality of substantially triangular shaped cutting teeth rigidly connected to the support arm in co-planar relation with said path of movement and disposed within said slots in the fingers, said teeth having laterally outwardly convergent side portions downwardly beveled to provide opposite upper leading cutting edges and lower trailing edges in coacting shearing engagement with corresponding leading and trailing edges of the fingers respectively so that during said reciprocation of the slide bar the upper leading edges of the teeth and their respective upper leading edges of the fingers are disposed in shearing engagement to sever encountered material prior to engagement of their corresponding lower trailing edges, said lower trailing edges of each finger being indented from its corresponding upper leading edge so that during engagement of the leading edges of the teeth and fingers their corresponding lower edges are displaced from each other along said path of movement to exhaust such material from the slot in the fingers to minimize clogging of the sickle and said tip portions of the guards being extended beyond the teeth to penetrate, divide, and direct material between said co-acting edges of the teeth and guards.

4. A guard for use with sickles having a plurality of teeth disposed in a common plane including upper leading and lower trailing side edges laterally convergent from the sickle in said plane; comprising a pair of fingers laterally extended from the sickle and being reciprocable for movement in a rectilinear path aligned with said plane of the teeth, said fingers including upper leading side edges and oppositely spaced lower trailing side edges defining a slot through the fingers to receive said teeth so that corresponding upper leading and lower trailing edges of the teeth and fingers co-act in shearing engagement.

5. A guard for use with sickles having a plurality of teeth disposed in a common plane including upper leading and lower trailing side edges laterally convergent from the sickle in said plane; comprising a pair of fingers laterally extended from the sickle and being reciprocable for movement in a rectilinear path aligned with said plane of the teeth, said fingers individually providing opposite upper and lower material guiding segments converging in outer tip portions and having opposite upper leading edges and spaced substantially parallel lower trailing edges defining a slot therebetween through the fingers so that during reciprocation of the guards the leading edges of the teeth and fingers co-act in shearing engagement to sever encountered material prior to engagement of their respective trailing edges with the latter displaced from each other to exhaust such material from the slot to minimize clogging of the sickle, and said tip portions of the guards being extended beyond the teeth to penetrate, divide and direct material between said co-acting edges of the teeth and guards.

6. A sickle comprising an elongated support arm; a pair of elongated slide bars mounted for reciprocation relative to each other upon the support arm; means for driving said bars in reciprocation relative to each other, a plurality of guards rigidly connected to one of said slide bars providing a plurality of longitudinally equally spaced fingers laterally outwardly extended from said slide bar, each of said fingers having opposite upper and lower material guiding segments including opposite upper leading edges and spaced substantially parallel lower trailing edges defining a slot therebetween through the fingers; and a plurality of teeth rigidily connected to the other of said slide bars being slidably disposed within said slots and having laterally outwardly convergent side portions, said side portions being beveled to include opposite upper leading cutting edges and lower trailing cutting edges in shearing engagement with said leading and trailiing edges of the fingers respectively so that during said reciprocation of the slide bars the leading edges of the teeth and fingers are disposed in shearing engagement to sever encountered material prior to engagement of their respective trailing edges thereof with said trailing edges displaced from each other to exhaust such material from the slot to minimize clogging of the sickle.

7. A sickle comprising an elongated support arm; a pair of elongated slide bars mounted for reciprocation relative to each other upon the support arm; means for driving said bars in reciprocation relative to each other, a plurality of guards rigidly connected to one of said slide bars providing a plurality of longitudinally equally spaced fingers laterally outwardly extended from said slide bar, each of said fingers having opposite upper and lower material guiding segments converging in outer tip portions, said segments including opposite upper leading edges and spaced substantially parallel lower trailing edges defining a slot therebetween through the fingers; and a plurality of teeth rigidily connected to the other of said slide bars being slidably disposed within said slot and having laterally outwardly convergent side portions, said side portions being beveled to include opposite upper leading cutting edges and lower trailing cutting edges in shearing engagement with said leading and trailing edges of the fingers respectively so that during said reciprocation of the slide bars the leading edges of the teeth and fingers are disposed in shearing engagement to sever encountered material prior to engagement of their respective trailing edges thereof with said trailing edges displaced from each other to exhaust such material from the slot to minimize clogging of the sickle, and said tip portions of the guards being extended beyond the teeth to penetrate, divide and direct material between the edges of the teeth and guards.

8. A sickle comprising an elongated support arm adapted to be mounted on a vehicle for earth traversing movement in a predetermined direction; a pair of elongated side bars borne by the support arm being longitudinally reciprocable from a power source on the vehicle; a plurality of guards rigidly connected to one of said slide bars providing a plurality of longitudinally equally spaced fingers laterally outwardly extended from said slide bar and reciprocable therewith through a rectilinear path of movement transversely of said direction of vehicle movement, each of said fingers having opposite upper and lower material guiding segments including opposite upper leading edges and spaced substantially parallel lower trailing edges indented from the leading edges along said path of finger movement defining a slot therebetween through the fingers; and a plurality of teeth rigidly connected to the other of said slide bars reciprocable therewith along said path of finger movement and being slidably disposed within said slot and having laterally outwardly convergent side portions, said side portions being beveled to provide opposite upper leading cutting edges and lower trailing edges in shearing engagement with said leading and trailing edges of the fingers respectively so that during said reciprocation of the slide bars the upper leading edges of the teeth and fingers are disposed in shearing engagement to sever encountered material prior to engagement of the respective lower trailing edges thereof with said trailing edges displaced from each other to exhaust such material from the slot to minimize clogging of the sickle.

9. A sickle comprising an elongated support arm adapted to be mounted on a vehicle for earth traversing movement in a predetermined direction; a pair of elongated slide bars borne by the support arm being longitudinally reciprocable from a power source on the vehicle; a plurality of guards rigidly connected to one of said slide bars providing a plurality of longitudinally equally spaced fingers laterally outwardly extended from said slide bar and reciprocable therewith through a rectilinear path of movement transversely of said direction of vehicle movement, each of said fingers having opposite upper and lower material guiding segments converging in outer tip portions, said segments including opposite upper leading edges and spaced substantially parallel lower trailing edges indented from the leading edges along said path of finger movement defining a slot therebetween through the fingers; and a plurality of teeth rigidly connected to the other of said slide bars reciprocable therewith along said path of finger movement and being slidably disposed within said slot and having laterally outwardly convergent side portions, said side portions being beveled to provide opposite upper leading cutting edges and lower trailing edges in shearing engagement with said leading and trailing edges of the fingers respectively so that during said reciprocation of the slide bars the upper leading edges of the teeth and fingers are disposed in shearing engagement to sever encountered material prior to engagement of the respective lower trailing edges thereof with said trailing edges displaced from each other to exhaust such material from the slot to minimize clogging of the sickle, and said tip portions of the guards being extended beyond the teeth to penetrate, divide and direct material between the edges of the teeth and guards.

10. A guard for use with reciprocated sickle teeth mounted for movement in a rectilinear path and having upper leading and lower trailing side edges laterally convergent from the path in a common plane, comprising a pair of fingers laterally extended from said path and reciprocable for movement along said rectilinear path in a direction opposite to said movement of the teeth, said fingers including upper leading side edges and oppositely spaced lower trailing side edges defining a slot through the fingers in a plane aligned with said path and slidably receiving said teeth therethrough so that corresponding upper leading and lower trailing edges of the teeth and fingers co-act in shearing engagement.

11. A guard for use with reciprocated sickle teeth mounted for movement in a rectilinear path and having upper leading and lower trailing side edges laterally convergent from the path in a common plane, comprising a pair of fingers laterally extended from said path and reciprocable for movement along said rectilinear path in a direction opposite to said movement of the teeth, said fingers individually providing opposite upper and lower material guiding segments converging in outer tip portions and having opposite upper leading edges and spaced substantially parallel lower trailing edges defining a slot therebetween through the fingers so that during reciprocation of the guard the leading edges of the teeth and fingers co-act in shearing engagement to sever encountered material prior to engagement of their respective trailing edges with the latter displaced from each other to exhaust such material from the slot to minimize clogging of the sickle, and said tip portions of the fingers being extended beyond the teeth to penetrate, divide and direct material between said co-acting edges of the teeth and guard.

References Cited by the Examiner
UNITED STATES PATENTS

| | | | |
|---|---|---|---|
| 16,057 | 11/1856 | Hubbard | 56—297 |
| 1,726,378 | 8/1929 | Barber | 56—310 |
| 2,619,787 | 12/1952 | Mills et al. | 56—310 |
| 2,722,798 | 11/1955 | Spedding et al. | 56—298 |
| 2,994,176 | 8/1961 | Stroburg et al. | 56—298 |

ABRAHAM G. STONE, *Primary Examiner.*

R. R. KINSEY, *Examiner.*